(12) United States Patent
Gratton

(10) Patent No.: US 8,193,504 B2
(45) Date of Patent: Jun. 5, 2012

(54) METHOD AND APPARATUS FOR THE IDENTIFICATION OF LITHOSPHERIC OR SHIELDED MATERIAL DEPOSITS BY DOPPLER-SHIFTED RESPONSE PHOTON SPECTRA FROM INTERROGATION BY IONIZING RADIATION

(76) Inventor: Luca Joseph Gratton, West Hollywood, CA (US)

(*) Notice: Subject to any disclaimer, the term of this patent is extended or adjusted under 35 U.S.C. 154(b) by 445 days.

(21) Appl. No.: 12/386,803

(22) Filed: Apr. 22, 2009

(65) Prior Publication Data
US 2009/0272906 A1    Nov. 5, 2009

Related U.S. Application Data

(60) Provisional application No. 61/126,300, filed on May 3, 2008.

(51) Int. Cl.
*G01N 23/22* (2006.01)
(52) U.S. Cl. .................... 250/358.1; 376/159
(58) Field of Classification Search .............. 376/159; 250/358.1
See application file for complete search history.

(56) References Cited

U.S. PATENT DOCUMENTS

| | | | |
|---|---|---|---|
| 4,008,392 A | 2/1977 | Lock | |
| 4,582,992 A | 4/1986 | Atwell | |
| 5,078,952 A | 1/1992 | Gozani | |
| 5,200,626 A | 4/1993 | Schultz | |
| 5,461,229 A | 10/1995 | Sauter | |
| 5,495,106 A | 2/1996 | Mastny | |
| 5,900,632 A | 5/1999 | Sterling | |
| 6,026,135 A * | 2/2000 | McFee et al. | 376/159 |
| 6,703,606 B2 | 3/2004 | Adolph | |
| 6,731,961 B2 | 5/2004 | Braig | |
| 6,754,586 B1 * | 6/2004 | Adolph et al. | 702/8 |
| 6,944,486 B2 | 9/2005 | Braig | |
| 7,006,857 B2 | 2/2006 | Braig | |
| 7,027,555 B2 | 4/2006 | Proctor | |
| 7,102,125 B2 | 9/2006 | Samworth | |
| 7,286,635 B2 | 10/2007 | Proctor | |
| 2009/0218489 A1 * | 9/2009 | Akers et al. | 250/307 |

OTHER PUBLICATIONS

G. Kirchhoff und R. Bunsen, "Chemische Analyse durch Spectralbeobachtungen," Annalen der Physik und der Chemie, Bd. 110 No. 6 (1860), S. 161-189, downloaded Sep. 14, 2011 from <http://www.ub.uni-heidelberg.de/helios/fachinfor/www/physik/erg/spek.pdf>.*

G. Kirchhoff and R. Bunsen, "Chemical Analysis by Observation of Spectra," Annalen der Physik und der Chemie, vol. 110 (1860), pp. 161-189, partial translation downloaded Sep. 13, 2011 from <http://www.chemteam.info/Chem-History/Kirchhoff-Bunsen-1860.html>.*

* cited by examiner

*Primary Examiner* — Constantine Hannaher

(57) ABSTRACT

A method and apparatus for the remote, non-invasive detection or characterization of materials manifests a controlled temperature perturbation to the sample material location concurrently with sample interrogation by ionizing radiation and with detection of the response emission energy spectra. This configuration induces and detects Doppler effects manifested at the sample location, allowing material inventory and composition measurements, and allowing a comparative reduction of the exposure duration compared to other isothermal proportional count, coincidence count or spectral analysis techniques. The method and apparatus apply primarily to the detection of elements and isotopes in baggage handling, cargo inspection, chemical characterization, process control and geologic operations, though the method and apparatus are not restricted to these applications. Though the magnitudes of the measured effects are substance specific, the contributing physical processes are not strictly material dependent, allowing method and apparatus applications to almost any high-energy photon-emitting material in multiple applications.

40 Claims, 1 Drawing Sheet

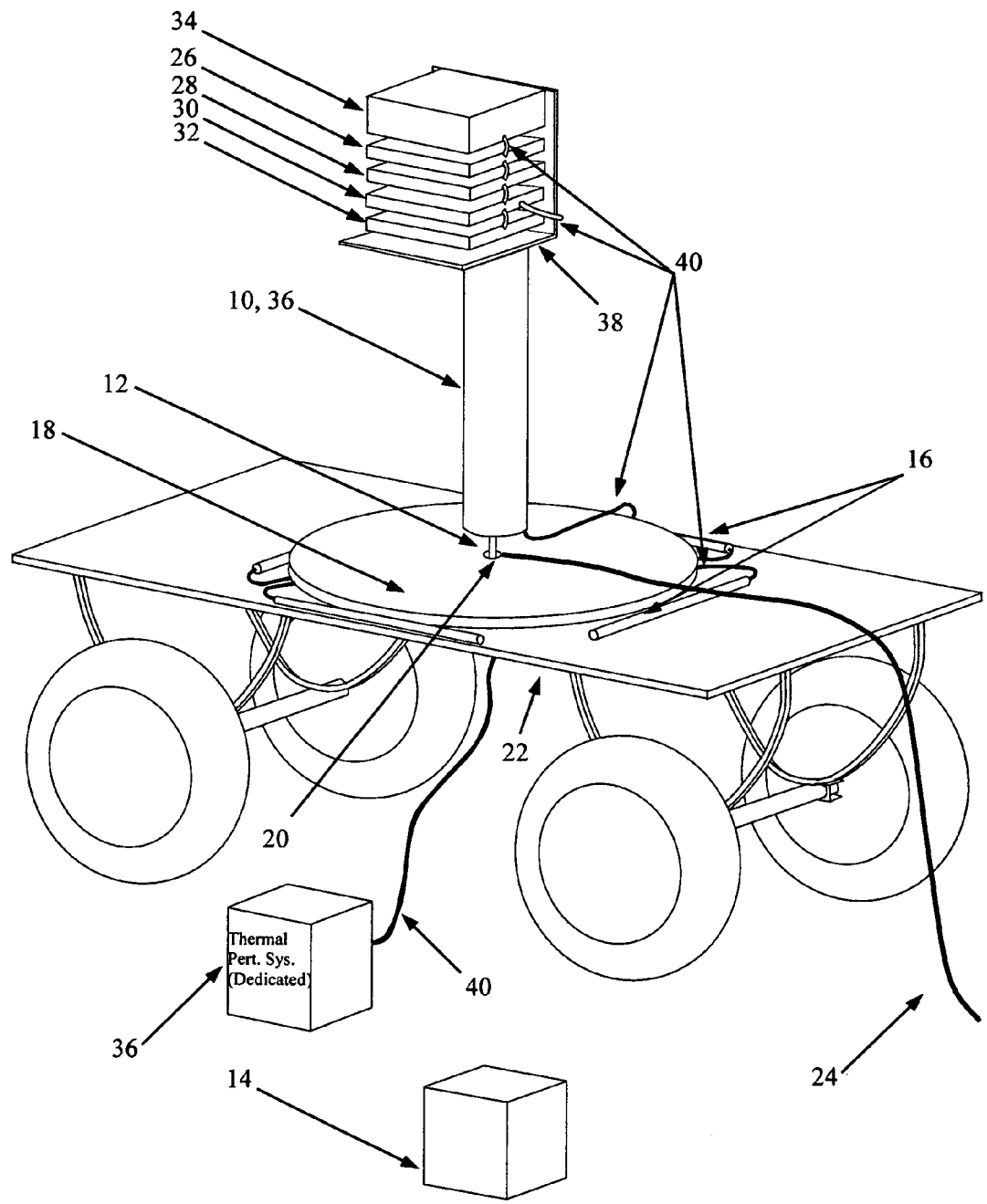

METHOD AND APPARATUS FOR THE IDENTIFICATION OF LITHOSPHERIC OR SHIELDED MATERIAL DEPOSITS BY DOPPLER-SHIFTED RESPONSE PHOTON SPECTRA FROM INTERROGATION BY IONIZING RADIATION

CROSS-REFERENCE TO RELATED APPLICATIONS

This application claims the benefit and priority of U.S. Provisional Application Ser. No. 61/126,300 filed May 3, 2008, by the present inventor, and entitled "Method and Apparatus for the Identification of Lithospheric or Shielded Material Deposits by Doppler-Shifted Response Photon Spectra from Interrogation By Ionizing Radiation," which is incorporated herein by reference in its entirety.

BACKGROUND OF THE INVENTION

The present invention relates to the field of active methods and apparatus that use ionizing radiation for the remote interrogation, non-destructive detection, survey, characterization and/or assay of materials that are screened or shielded from the radiation detectors by intervening materials.

Demonstrated techniques for material detection, assay, or lithospheric, chemical and/or isotopic characterizations that use ionizing radiation as the response indicator, and often additionally in a necessary interrogation process, all fundamentally require either a proportional response intensity measurement, or scrutiny of some portion of the energy spectrum for the response emission. The impetus for using ionizing radiation is its ability to penetrate material with modest attenuation of its intensity in optimal configurations, thereby providing an ability to sense or survey the interior of objects by a non-destructive or non-intrusive means. In material detection, assay, or characterization applications involving dense materials (i.e., materials with mass densities greater than liquid water), the effective detection range of radiation providing the response indication is on the order of centimeters to many tens of centimeters, as measured from the interior locations where the radiation is generated to the location that the emission is sensed. The radiation range is primarily a function of the initial energy borne by the emission, with greater energy generally corresponding to greater range. This penetration distance limitation places practical constraints on the ability for remote detection or survey in many applications. Applications where range limitations may be relevant include materials detection in baggage handling and cargo container inspection; coal, ash and slag characterization; structural fitness, process throughput, process holdup and composition uniformity surveys; and lithospheric and diagenic fluid characterization in geologic well and borehole logging applications.

Where penetration distances are short, the most common mitigation involves allowing a longer temporal duration for the measurement of response emissions. Because a diminished fraction of the total emission borne at the point of origin is capable of reaching the detection location with increased penetration distance, a comparatively longer exposure time is required to detect a sufficient number of responses for statistical qualification by proportional count, coincidence and spectral measurement techniques. Increased measurement times place additional burdens on the baggage handling, cargo inspection, hydrocarbon characterization, process control and geologic operations previously suggested.

The measurement duration may be reduced where additional information is available in the response emissions emerging from the sample location. Intentional, controlled heating of the sample location will induce Doppler broadening of the reaction cross sections and response emission energy spectra. The magnitudes of the changes to the intensities and widths of the characteristic peaks in the response emission energy spectra with known temperature changes provide the additional information about material inventory and composition. If controlled temperatures changes can be induced on time scales that are shorter than the requisite standard proportional or coincidence counting times for the desired accuracy in an isothermal measurement, it is possible to maintain desired accuracy with a comparatively shorter duration count and smaller response emission sample size by observing the magnitude of the Doppler effect on characteristic reaction or emission characteristics in the response spectrum.

The present invention describes a method and apparatus that manifests a controlled temperature perturbation to the sample location concurrently with sample interrogation by ionizing radiation and with detection of the response emission energy spectra. This configuration induces and detects Doppler effects manifested at the sample location, allowing additional measures of material inventory and composition, and allowing a reduction in the requisite counting time or exposure duration. The method and apparatus is intended primarily for the detection of isotopes of Cesium, Iodine, Neptunium, Plutonium, Technetium, and Uranium. Though the magnitudes of the measured effects are substance specific, the contributing physical processes are not strictly material dependent, and the applicability of the method and apparatus is not restricted to the foregoing list of materials, but can be applied to almost any high-energy photon-emitting material.

SUMMARY OF THE INVENTION

There is disclosed herein the methods and apparatus of the present invention that uses ionizing radiation to detect and characterize spatially remote material or sample emplacements that may be screened from the detection location by intervening materials. The apparatus comprises: a mobile platform for position and orientation adjustments of the apparatus, an ionizing radiation beam source for generating an interrogation beam that is directed to the sample emplacement, a photon detector array disposed to intercept impinging radiation that emanates from the sample emplacement in response to interrogation and to convert the interactions of radiation with detector materials to electrical signals, signal processing means to analyze, condition and extract useful portions of the electrical signals, electronic storage means to archive the electronic signals, thermal management means to stabilize temperatures of sensitive components. The apparatus additionally comprises electronic controller means to regulate the operation and power levels of the interrogation beam, to regulate the signal processing means, and to regulate the thermal management means, a means for transmission and reception of electromagnetic signals with said means integrated to the controller means for the purpose of communications with a remote operator, and a means for inducing a thermal perturbation at the sample emplacement.

The methods and apparatus are most suitable to the detection of material beneath a lithospheric overburden in non-intrusive geologic applications, and behind engineered shielding in non-destructive, non-intrusive materials' control, accountability, security, assay or process control applications.

The present invention requires a source of ionizing radiation that is collimated to form a unidirectional interrogation beam. The beam-line is directed at the desired sample location for material interrogation. With sufficient interrogation beam penetration to the desired sample location, reactions of the source radiation with the material residing at the sample location produce prompt-and delayed-response radiation emissions characteristic of the combination of the interrogating particle, the resident material or material-mixture, and the surrounding matrix material. The response emissions may be of a different type than that characteristic of the interrogation beam. In the current invention, ionizing photons generated at the sample location are detected by a remote detector array located in the vicinity of the interrogation source. The interrogation source and photon detection components of the invention are mounted on a field-deployable, orientation-adjustable platform in a preferred embodiment.

The method relies on measurement of the photo-spectrum throughout a range of detected energies for the response emissions. Local response intensities in the measured spectrum relative to a spectrum baseline are indicative of spontaneous, inelastic neutron scatter, neutron capture, non-capture neutron absorption, neutron activation, photoelectric, Compton scatter or annihilation reactions involving individual isotopes of the material composing the emplacement. The locations and intensities of the peaks throughout the spectrum provide an effective identification "footprint" that can be used to quantify both the material composition and material inventory. Specific methods that employ a photo-spectrum measurement for the characterization of the material have been introduced, and this aspect of the present method is not novel. Representative systems for active, non-intrusive material detection or analysis are given by Lock et al. in U.S. Pat. No. 4,008,392 for application Ser. No. 05/536,525 filed Dec. 26, 1974, by Mastny in U.S. Pat. No. 5,495,106 for application Ser. No. 08/320,612 filed Oct. 6, 1994, by Adolph in U.S. Pat. No. 6,703,606 for application Ser. No. 09/929,680 filed Aug. 14, 2001 and by Samworth in U.S. Pat. No. 7,102,125 for application Ser. No. 10/661,851 filed Sep. 12, 2003, for in situ geologic formation or chemical analysis using pulsed interrogation or response gating. Representative systems for active, non-intrusive material detection or analysis are given by Atwell et al. in U.S. Pat. No. 4,582.992 for application Ser. No. 06/639,577 filed Aug. 10, 1984, for bulk material or process control chemical and isotopic analysis. Representative systems for active, non-intrusive material detection or analysis are given by Gozani et al. in U.S. Pat. No. 5,078,952 for application Ser. No. 07/463,036 filed Jan. 10, 1990 and Schultz et al. in U.S. Pat. No. 5,200,626 for application Ser. No. 07/500,165 filed Mar. 28, 1990, for security, baggage handling, or cargo inspection applications.

A novel aspect of the present method is the intentional variation of the material temperature at the emplacement as a means to gauge the effect on the response-emission photon spectrum. The temperature variation introduces a Doppler effect, where both the interrogating particle reaction cross sections are broadened and the photon emission bands are perturbed. A controlled, incremental temperature variation of the emplacement material can be made, with spectral measurements made at the initial temperature, the final temperature, and at intervals between temperature extremes.

Sterling et al., in U.S. Pat. No. 5,900,632 for application Ser. No. 08/820,378 filed Mar. 12, 1997, employ an analogous induced temperature shift to analyze material composition. However, the non-intrusive method of U.S. Pat. No. 5,900,632 uses an unrelated physical effect associated with Planck's Law instead of a Doppler effect dependent on the characteristics of nuclear structure, and its scope is limited to penetration depths on the order of 300 microns for non-ionizing radiations in the infrared and visible portions of the electromagnetic spectrum. Similarly, Sauter et al., in U.S. Pat. No. 5,461,229 for application Ser. No. 08/254,903 filed Jun. 6, 1994, introduce techniques for in situ chemical analysis by inducement of a temperature shift or gradient, but all also limit the scopes of the claims to spectral effects predicted by Planck's Law for infrared radiation emanating from a thin material layer commensurate with the optical depth of infrared radiation near a surface (i.e., again within a layer of approximate 300 micron thickness). Likewise, Braig et al., in U.S. Pat. No. 6,731,961 for application Ser. No. 10/291,912 filed Nov. 8, 2002, Braig et al., in U.S. Pat. No. 6,944,486 for application Ser. No. 10/456,109 filed Jun. 6, 2003, and Braig et al., in U.S. Pat. No. 7,006,857 for application Ser. No. 10/426,160 filed Apr. 28, 2003, all introduce techniques for in vivo or in vitro chemical analysis by inducement of a surface temperature gradient, but all also limit the scopes of the claims to spectral effects predicted by Planck's Law for the onion-skin-effect of (predominantly) infrared radiation emanating from a thin material layer capable of optical transmission to a proximate surface.

Proctor, in U.S. Pat. No. 7,027,555 for application Ser. No. 10/754,972 filed Jan. 10, 2004, and in U.S. Pat. No. 7,286,635 for application Ser. No. 11/305,463 filed Dec. 16, 2005, uses a genuine Doppler effect dependent on the characteristics of nuclear structure to compensate for nuclear recoil effects during non-intrusive material composition analysis using ionizing radiation. U.S. Pat. Nos. 7,027,555 and 7,286,635 utilize a classic resonant photon absorption technique with centrifuge-type motion for Doppler compensation. However, the Doppler effect for U.S. Pat. Nos. 7,027,555 and 7,286,635 is not thermally induced (i.e., not directionally unbiased), is restricted to reactions involving photons, and merely provides energy tuning or correction for the interrogating photon. The Doppler effect and the magnitude of departure from a peak resonance or reference condition for U.S. Pat. Nos. 7,027,555 and 7,286,635 do not directly constitute a basis for material identification from the response radiation as in the present invention.

The thermally derived Doppler effect for the present invention produces predictable shifts of the characteristic peak intensities (i.e., heights) and widths within windowed response emission energy ranges. Knowledge of the instantaneous emplacement material temperature and the magnitude of the Doppler effect on portions of the response spectra provides information that can be used to improve the accuracy of the present method over conventional isothermal methods, even at low count rates.

The present invention is most effectively used in the detection of isotopes of the following elements: Cesium, Iodine, Neptunium, Plutonium, Technetium, and Uranium. In general, the present invention may be used in the detection of isotopes of any element with a non-negligible magnitude of the nuclear reaction probability for spontaneous emission, neutron activation, photon-emission by neutron-capture, photon-emission by inelastic neutron scatter, or photo-nuclear reaction. Therefore, the foregoing list of elements and isotopes is not exhaustive, and the materials that the present invention is capable of detecting are more numerous than those listed. The scope of the present invention is not limited to those materials listed above. Detection efficacy of the invention in a specified use-scenario is determined by the configuration and materials manifest to a specific application, and by the type of interrogation radiation for the implementation.

The primary types of ionizing radiation for interrogation are neutrons or high-energy photons. If reactor-energy neutrons are suitable for the interrogation beam in a specific application, encapsulated isotopic source with a chopper can be utilized. A D-T neutron generator, accelerator-based or microtron-based method can be used where higher energy neutrons are required. Photons of selected energies can be generated with an electron accelerator, target and beam diverter. The needed temperature perturbation of the emplacement and surrounding medium can be accomplished by many remote means, including integral use of the attenuated-portion of interrogation beam, ultrasonic agitation, sonic agitation, pressure wave propagation, microwave irradiation, visible spectrum laser irradiation, infrared spectrum laser irradiation, electrical resistance heating, and electromagnetic induction heating. Direct contact methods that rely on emplacing a heating element, or on the injection of hot or vaporized fluids, in the vicinity of the emplacement can also be employed. However, the use of these direct contact methods eliminates a major advantage in the simple and non-invasive use of the present invention.

Detection, management and recording subsystems supporting measurement of the response radiation spectrum are incorporated in the present invention. An embodiment of the present invention includes Helium-3 and Helium-4 detectors located on the platform for neutron source intensity, neutron source spectrum, and neutron backscatter measurements for station-keeping, process control, measurement calibrations, shielding, material activation and environmental and health physics purposes. A monolithic array of concentric rings of photon detectors collocated in a plane that is effectively perpendicular to the interrogation beam direction is mounted on the platform to detect the response radiation emerging from the emplacement medium. The photon detectors are high-purity Germanium in the preferred embodiment. This same array would also measure photon source intensity, photon source spectrum, and photon backscatter in applications involving the use of a photon source for interrogation. Process controller, signal processing, thermal management, cabling and fastener, and electronic storage media subsystems are additionally mounted on the platform. The thermal management subsystem may include either a solid-state electronic or vapor-compression heat rejection system for detector and source temperature stabilization. Shielding subsystems may be disposed on the apparatus platform to preclude activation of structures or structural materials. A transmitter/receiver system is also mounted on the platform to facilitate remote operation, control and data transfer for the system. The transmitter/receiver system is integrated to all of the remaining subsystems except for the shielding, and the cabling and fastener subsystems.

The novel aspect of the present invention is the ability to perform interrogation, detection and heating of the emplacement from a remote location. Unlike existing methods, particularly for geologic and lithospheric applications, no excavated borehole, keyway, or beam port clearance requirements exist. The sample and emplacement remain undisturbed, and the method and implementation are genuinely non-intrusive and non-destructive, in the preferred embodiment to the extents that the thermal perturbations and exposures to ionizing radiation produce no significant material alterations or accumulations of transmuted long-lived isotopes. Finally, unlike existing methods that rely only on response spectrum intensity measurements, additional information from spectral shifts of indicial maxima and widths for known or inferred system temperatures are systematically used for the determination of sample composition and inventory.

A high energy interrogation source is required for use in geologic or heavily shielded applications. It is anticipated that the invention be operated by remote control by personnel at significant spatial standoff distance for the minimization of effective dose to humans.

BRIEF DESCRIPTION OF THE DRAWINGS

The FIGURE is a schematic depiction of one embodiment of the apparatus for the present invention.

DETAILED DESCRIPTION OF THE INVENTION

The present invention requires a source of ionizing radiation that is collimated to form a unidirectional interrogation beam. The beam-line is directed at the desired sample location for material interrogation. With sufficient interrogation beam penetration to the desired sample location, reactions of the source radiation with the material residing at the sample location produce prompt-and delayed-response radiation emissions characteristic of the combination of the interrogating particle, the resident material or material-mixture, and the surrounding matrix material. The response emissions may be of a different type than that characteristic of the interrogation beam. In the current invention, ionizing photons generated at the sample location are detected by a remote detector array incorporating active scintillation or semiconductor materials and located in the vicinity of the interrogation source. The interrogation source and photon detection components of the invention are mounted on a field-deployable, orientation-adjustable platform in the preferred embodiment.

The method relies on measurement of the photo-spectrum throughout a range of detected energies for the response emissions. Local response intensities in the measured spectrum relative to a spectrum baseline are indicative of spontaneous, inelastic neutron scatter, neutron capture, non-capture neutron absorption, neutron activation, photoelectric, Compton scatter or annihilation reactions involving individual isotopes of the material composing the emplacement. The locations and intensities of the peaks throughout the spectrum provide an effective identification "footprint" that can be used to quantify both the material composition and material inventory. Specific methods that employ a photo-spectrum measurement for the characterization of the material have been introduced, and this aspect of the present method is not novel. A novel aspect of the present method is the intentional variation of the material temperature at the emplacement as a means to gauge the effect on the response-emission photon spectrum.

The temperature variation introduces a Doppler effect, where both the interrogating particle reaction cross sections are broadened and the photon emission bands are perturbed. A controlled, incremental temperature variation of the emplacement material can be made, with spectral measurements made at the initial temperature, the final temperature, and at intervals between temperature extremes. This Doppler effect produces predictable shifts of the characteristic peak intensities (i.e., heights) and widths within windowed response emission energy ranges. Knowledge of the instantaneous emplacement material temperature and the magnitude of the Doppler effect on portions of the response spectra provides information that can be used to improve the accuracy of the present method over conventional isothermal methods, even at low count rates.

The present invention is most effectively used in the detection of isotopes of the following elements: Cesium, Iodine, Neptunium, Plutonium, Technetium, and Uranium. In general, the present invention may be used in the detection of isotopes of any element with a non-negligible magnitude of the nuclear reaction probability for spontaneous emission, neutron activation, photon-emission by neutron-capture, photon-emission by inelastic neutron scatter, or photo-nuclear reaction. Therefore, the foregoing list of elements and isotopes is not exhaustive, and the materials that the present invention is capable of detecting are more numerous than those listed. The scope of the present invention is not limited to those materials listed above. Detection efficacy of the invention in a specified use-scenario is determined by the configuration and materials manifest to a specific application, and by the type of interrogation radiation for the implementation.

Referring to the Figure, a schematic specification of one particular embodiment of the current invention is structured in accord with the functional specifications of the current method and apparatus. The system of the Figure is adapted to project a beam of neutrons toward a sample emplacement, and to collect emergent photons emitted from the emplacement location. An alternate embodiment is identical to the system of the Figure with the exception that it projects a beam of ionizing photons toward a sample location. The apparatus analyzes characteristics of the response-emission photon spectrum to facilitate material identification and characterization by the user.

The system of the Figure includes a neutron source 10. The neutron source unit is modular, thereby allowing user selectivity of the neutron source type, neutron energy and peak source intensity. The neutron source is highly directional, and preferably monoenergetic with little energy spread across the beam front. One type of neutron source that meets these specifications and facilitates simple integration with the control system is a D-T generator. Other relevant types of neutron sources include encapsulated isotopic neutron emitters, encapsulated isotopic alpha emitters embedded in neutron-generating matrix materials, encapsulated isotopic photo-neutron sources, and electron beam accelerators with neutron-generating target materials. Implementations with the additional neutron generators may require integral collimators to ensure beam direction, shutters to control emissions, and chopper-plates for energy or exposure duration sensitivity.

An alternate embodiment of the system in the Figure replaces the neutron source 10 with a photon source. An electron accelerator fitted with a photon-generating target material and beam diverter supports simple integration with the control system and satisfies functional requirements.

The apparatus of the Figure emits an interrogation beam of ionizing radiation 12 towards the sample material emplacement 14. The neutron source 10 may be operated in any of multiple modes to produce a temporally pulsed or continuous emission of the interrogation beam 12.

The apparatus of the Figure further includes a ring of neutron detectors 16 residing in the plane of the monolithic photon detector array 18. The neutron detectors 16 are Helium-3 and Helium-4 pressurized gas detectors, intended to detect neutron fluxes outside of the beam line for diagnostic purposes. The monolithic photon detector array 18 is comprised of multiple detectors set into a large, co-planar array with the detection window of each detector oriented to be predominantly parallel to the interrogation beam line direction. The photon detectors are high-purity Germanium in the preferred embodiment. Sodium Iodide detectors are disposed as the component photon detectors of the array 18 in an alternate embodiment. The number of detector elements in the array 18 may vary with the application and the optimal detector material dimensions, and the elements may be configured to allow the determination of the directions of photon streaming. The detector elements of the array are arranged concentrically around a beam port 20 at the center of the array. The plane in which the photon detector array 18 resides is perpendicular to the interrogation beam line direction 12. The orientation of photon detector array 18 and the attached neutron source 10 are adjustable relative to the transportable platform 22 on two perpendicular axes passing through the plane of the detector array for the purpose of aiming the apparatus at the sample material emplacement 14.

In operation of the device in the Figure, all system-keeping and interrogation source power is supplied externally by way of cabling 24. Communications in the form of electromagnetic signals occur between a remote command station and the transmitter/receiver unit 26 on the system allowing the remote start, stop, and data transfer of system diagnostic and measurement information. Transmitter/receiver unit 26 communications to a remote transmitter/receiver unit may occur over wireline or may be wireless. The transmitter/receiver unit 26 is interfaced with an electronic central controller unit 28, that regulates operation and power level of the interrogation source 10, operation of the detectors 16 and 18, operation of the signal processor and analyzer 30, operation of the data storage unit 32, operation of the thermal management system 34, and operation of the means for induction of the thermal perturbation 36. The central controller unit 28 is a microprocessor. Cabling 40 for electronic communications among components on the platform and structural fasteners are needed and numerous. Additionally, selected components may require shielding 38 from shine emanating from the direction of the sample material emplacement. The shielding 38 may comprise low or high molecular weight materials such as Polyethylene, Lead, and Tungsten.

The signal processor and analyzer unit 30 of the device in the Figure receives electronic signals from detectors 16 and 18. The unit performs any desired gating of detection events, translates input signals from the detectors to energy, position and time specific events, performs any programmed transformations or conversions by mapping input signals to transformed output signals, windows events according to energy, position or time classifications, and communicates directly with the central controller 28 to provide feedbacks for system control functions.

Output from the signal processor and analyzer unit 30 may present measured or conditioned information about the response-emission photon spectrum in various forms. Output spectral information presentations include absolute measurements for full spectrum, individual full-energy peak position in energy, individual full-energy peak amplitude, individual full-energy peak full-width-at-fractional-maximum (FWFM), full-energy peak area, peak-height-ratios, peak-area-ratios, FWFM-ratios, integrated totals, or integrated areas beneath a spectrum and within an energy window comprising multiple regions-of-interest. Any of these absolute output presentations may furthermore be expressed as differential quantities relative to directly comparable background or baseline spectral information. Additional outputs include estimates of sample emplacement material mass inventory, material mass concentration, elemental composition and isotopic composition calculated by response functions from prior calibrations. For the present invention, a background measurement is defined as a measurement situation with the material(s) of interest removed, but with measurement configuration, system dimensions, matrix composition and environmental characteristics identical to those for a measurement including the material(s) of interest. A baseline measurement is relevant reference spectral information that does not qualify as background.

The power level and operation status of the thermal management system 34 in the device in the Figure is continuously adjusted by the central controller 28 to maintain stable setpoint temperatures in the detector array 18, the neutron source housing 10, and select electronic enclosures disposed on the platform. It consists of distributed thermocouples for component temperature measurements, distributed evaporators for component temperature stabilization, a programmable controller for servo and switch operation, servo motors, switches, a vapor compression and heat rejection unit, refrigerant ducting, and a refrigerant fluid, preferably Argon. An alternate embodiment of the thermal management system 34 replaces the Argon refrigerant with Nitrogen. An additional alternative embodiment of the thermal management system 34 replaces the Argon refrigerant with Carbon Dioxide. An additional alternative embodiment of the thermal management system 34 replaces the vapor compression and heat rejection system, the distributed evaporators, the refrigerant ducting, and the refrigerant with an electronic solid-state cooling system consisting of a power supply, electric wire leads, and distributed cooling pads for component temperature stabilization.

The means for thermal perturbation 36 of the sample material emplacement 14 includes integral use of the interrogation radiation beam 12 in a pulsed or continuous mode in the preferred embodiment. The ionizing radiation of the beam may be inelastically scattered and absorbed by the matrix material in addition to the material at the sample emplacement. A fraction of the radiated energy is lost to the emplacement material and manifested as heat, which can be utilized to elevate the temperature of the emplacement material. In typical configurations where the thermal time constant for the material is much smaller than 1 [seconds-per-Celsius-degree] with a pencil interrogation beam spot size, it is possible to heat the material at the sample emplacement by 1000 [degrees-Celsius] in less than one-half of one hour in the most limiting configurations. There are material-and configuration-specific limitations on the maximum allowable sample material temperature, which must be accommodated in the operation of the device described in the Figure. The central controller 28 regulates any such limitations. Spectral information returned by the detector array 18 indicates temperature changes by relative shifts of the intensities or shapes of the characteristic peaks in the background contribution to the photon spectrum from the matrix material surrounding the sample emplacement location. This temperature sensitive background spectrum is therefore used for the inference or measurement of material temperature at the emplacement location with any embodiment of the thermal perturbation system 36. Embodiments that manifest thermal perturbations by alternate means include the incorporation of a dedicated component, or system of components, 36, as the interrogation beam 12 no longer uniquely provides the means. An alternate means for implementation of the thermal perturbation system 36 involves the replacement of the interrogation beam 12 as the primary means with the alternative use of an ultrasonic agitation system consisting of an ultrasonic generator. An additional alternate means for implementation of the thermal perturbation system 36 involves the replacement of the interrogation beam 12 as the primary means with the alternative use of a sonic agitation system consisting of a sonic generator. An additional alternate means for implementation of the thermal perturbation system 36 involves the replacement of the interrogation beam 12 as the primary means with the alternative use of a directional compression device consisting of a shock-tube or pressure generator. An additional alternate means for implementation of the thermal perturbation system 36 involves the replacement of the interrogation beam 12 as the primary means with the alternative use of a microwave irradiation device consisting of a directional microwave generator. An additional alternate means for implementation of the thermal perturbation system 36 involves the replacement of the interrogation beam 12 as the primary means with the alternative use of a laser device consisting of a visible wavelength laser generator. An additional alternate means for implementation of the thermal perturbation system 36 involves the replacement of the interrogation beam 12 as the primary means with the alternative use of a laser device consisting of an infrared wavelength laser generator. An additional alternate means for implementation of the thermal perturbation system 36 involves the replacement of the interrogation beam 12 as the primary means with the alternative use of an electrical resistance heating device consisting of a current or voltage generator, electrical cable leads, electrodes, and the use of the sample emplacement material region as an effective electrical resistance element. An additional alternate means for implementation of the thermal perturbation system 36 involves the replacement of the interrogation beam 12 as the primary means with the alternative use of an electromagnetic induction device consisting of a current generator, a conductive induction winding that enshrouds the emplacement location, and the use of the sample and the material surrounding the emplacement as the inductor core plug material.

Direct contact methods offer alternative embodiments for the thermal perturbation system 36, and may provide a more efficient means of heating the emplacement location. Operational control of these alternative thermal perturbation means is also implemented by the central controller 28, as for the other embodiments. Direct contact methods include replacing the interrogation beam 12 as the primary means with the alternative use of spatial heating elements, or hot or vaporized fluid injections, at the emplacement location in an implementation of the thermal perturbation system 36. However, they greatly reduce the agility of use of the device in the Figure because invasive means are required to heat the sample region. Additionally, the heating elements for the direct contact methods may require retraction during the interrogation and measurement cycles to preclude material activation and response spectrum measurement error. The use of direct contact heating methods may also have the overall effect of increasing the requisite time for individual measurements because the exposure times are then supplemental to the time necessary to produce keyways, boreholes, or other access routes for juxtaposition of the heater with the emplacement location.

The foregoing disclosure, description and drawings illustrate the principles of the current invention, and are not meant to limit the practice of said principles. Variations of the foregoing embodiments that manifest the principles may be apparent to those skilled in the art. Accordingly, all embodiments that equivalently manifest the principles of the current invention define the scope of the current invention.

The invention claimed is:

1. A method for the remote detection and characterization of materials at a sample material emplacement with ionizing radiation, that requires thermally-induced Doppler broadening of nuclear reaction cross sections, comprising the steps of:
    (a) generating a unidirectional interrogation beam composed of ionizing radiation at a platform used as a stage for a detection and characterization operation;

(b) directing an interrogation beam composed of ionizing radiation to irradiate a remote sample material emplacement or a portion thereof;

(c) generating a secondary ionizing photon radiation by spontaneous, particle capture, inelastic particle scattering, and particle activation reactions of the interrogation beam with the material at the emplacement location;

(d) detecting secondary photon radiations emitted from the sample material emplacement in interaction events in detector materials disposed at a remote location adjacent to the location where the interrogation beam originates;

(e) converting interaction events by secondary photons, including those emitted from the sample material emplacement location, with the detector materials to detector response electronic signals;

(f) processing the detector response electronic signals remotely to generate spectral information by cataloging the actuarial detection frequency or cumulative event count in specific incident photon energy intervals;

(g) changing the temperature of the sample material emplacement remotely in a controlled fashion to induce Doppler broadening of nuclear reaction cross sections by use of an apparatus disposed for the purpose of creating said temperature change;

(h) and, assessing remotely the changes produced by sample material emplacement temperature perturbations to the spectral information generated from the detector response electronic signals to calculate or infer the mass inventory and composition of material at the sample emplacement.

2. A method according to claim 1, wherein an interrogation beam composed of ionizing radiation comprises neutron radiation directed to irradiate the sample material emplacement or a portion thereof.

3. A method as in claim 1, wherein an interrogation beam composed of ionizing radiation comprises photon radiation directed to irradiate the sample material emplacement or a portion thereof.

4. A method as in claim 3, wherein a secondary ionizing photon radiation occurs by capture, inelastic scatter, spontaneous, or photo-nuclear reactions of an interrogation photon beam with the material at the emplacement location.

5. An apparatus for the remote detection and characterization of materials at a sample material emplacement with ionizing radiation, that manifests thermally-induced Doppler broadening of nuclear reaction cross sections, with said apparatus comprising:

(a) an ionizing radiation source having a beam controller and collimator that collectively operate to provide a unidirectional interrogation beam of selected energy that can be operated in pulsed or continuous modes;

(b) a transportable platform that bears the ionizing radiation source and beam controller, and allows directional adjustment of the emitted interrogation beam to aim said beam towards the sample material emplacement;

(c) a measurement detector array disposed on the platform to intercept photons generated at the sample emplacement location;

(d) a diagnostic detection system composed of multiple neutron detectors disposed on the platform to gauge interrogation source operation and radiation status;

(e) a signal processor and analyzer system that communicates with the measurement and diagnostic detectors to receive the detector output signals, process said signals to generate both system status, and spectral information by cataloging the actuarial detection frequency or cumulative event count in specific incident photon and neutron energy intervals, and to compare and manipulate said spectra in manners specified by the user for the purpose of system-keeping, sample material inventory and composition measurement;

(f) a thermal perturbation system, at least partially comprising an interrogation beam composed of ionizing radiation generated by the ionizing radiation source, that induces material temperature changes at the sample emplacement in a controlled and measured fashion;

(g) a thermal management system disposed on the platform for the purpose of stabilizing temperatures of detectors and other sensitive components;

(h) a transmitter/receiver system disposed on the platform and capable of operational command and data transfer communications;

(i) power cabling for the provision of externally supplied electrical power to electrically energized components disposed on the platform;

(j) a central controller system disposed on the platform that regulates, starts, stops and implements operational setpoints for the interrogation beam, diagnostic detector system, measurement detector system, thermal perturbation system, thermal management system and transmitter/receiver system;

(k) radiation shielding disposed on the platform to screen radiation-sensitive components;

(l) and, cabling for electrical connectivity among components disposed on the platform.

6. An apparatus according to claim 5, wherein the ionizing radiation source is a neutron source having a neutron beam controller and collimator that operates to provide a unidirectional interrogation neutron beam of selected energy that can be operated in pulsed or continuous modes.

7. An apparatus as in claim 6, wherein the neutron source is a D-T neutron generator.

8. An apparatus as in claim 6, wherein the neutron source is an encapsulated isotopic neutron emitter.

9. An apparatus as in claim 6, wherein the neutron source is an encapsulated isotopic alpha emitter embedded in neutron-generating matrix material.

10. An apparatus as in claim 6, wherein the neutron source is an encapsulated isotopic photoneutron source.

11. An apparatus as in claim 6, wherein the neutron source is an electron beam accelerator with a neutron-generating target.

12. An apparatus as in claim 6, wherein the neutron source is fitted with a beam chopper-plate device.

13. An apparatus as in claim 6, wherein the dedicated component or system of components in the thermal perturbation system that induces the thermal perturbation to the sample material at the emplacement is exclusively the interrogation neutron beam generated by a neutron source.

14. An apparatus as in claim 5, wherein the ionizing radiation source is an ionizing photon source having a photon beam controller that operates to provide a unidirectional interrogation photon beam of selected energy that can be operated in pulsed or continuous modes.

15. An apparatus as in claim 14, wherein an ionizing photon source having a photon beam controller is disposed in the form of an electron accelerator fitted with a photon-generating converter material and beam diverter.

16. An apparatus as in claim 14, wherein the dedicated component or system of components in the thermal perturbation system that induces the thermal perturbation to the sample material at the emplacement is exclusively the interrogation photon beam generated by a photon source.

17. An apparatus as in claim 5, wherein the measurement detectors are arranged in a common plane as a monolithic structure with a cavity at the center comprising a beam port.

18. An apparatus as in claim 5, wherein the measurement detectors are arranged in a common plane as a monolithic structure capable of orientation adjustments on two perpendicular axes residing in the plane of the detector array for the purpose of aiming the apparatus.

19. An apparatus as in claim 5, wherein the measurement detector array comprises component detectors containing active semiconductor materials.

20. An apparatus as in claim 5, wherein the measurement detector array comprises high-purity Germanium detectors.

21. An apparatus as in claim 5, wherein the measurement detector array comprises component detectors containing active scintillation materials.

22. An apparatus as in claim 5, wherein the measurement detector array comprises Sodium Iodide detectors.

23. An apparatus as in claim 5, wherein the diagnostic detector system comprises a combination of Helium-3 and Helium-4 pressurized gas detectors.

24. An apparatus as in claim 5, wherein the central controller system is a programmable microprocessor.

25. An apparatus as in claim 5, wherein Polyethylene shielding is disposed.

26. An apparatus as in claim 5, wherein Lead shielding is disposed.

27. An apparatus as in claim 5, wherein Tungsten shielding is disposed.

28. An apparatus as in claim 5, wherein the thermal management system comprises distributed thermocouples, distributed evaporators, a programmable controller, distributed actuators, a vapor compression and heat rejection unit, refrigerant ducting, and Argon refrigerant.

29. An apparatus as in claim 5, wherein the thermal management system comprises distributed thermocouples, distributed evaporators, a programmable controller, distributed actuators, a vapor compression and heat rejection unit, refrigerant ducting, and Nitrogen refrigerant.

30. An apparatus as in claim 5, wherein the thermal management system comprises distributed thermocouples, distributed evaporators, a programmable controller, distributed actuators, a vapor compression and heat rejection unit, refrigerant ducting, and Carbon Dioxide refrigerant.

31. An apparatus as in claim 5, wherein the thermal management system comprises distributed thermocouples, distributed actuators, a power supply, electric wire leads, and distributed solid-state electronic cooling pads.

32. An apparatus as in claim 5, wherein the dedicated component or system of components in the thermal perturbation system that primarily induces the thermal perturbation to the sample material at the emplacement is an ultrasonic acoustic generator.

33. An apparatus as in claim 5, wherein the dedicated component or system of components in the thermal perturbation system that primarily induces the thermal perturbation to the sample material at the emplacement is a sonic acoustic generator.

34. An apparatus as in claim 5, wherein the dedicated component or system of components in the thermal perturbation system that primarily induces the thermal perturbation to the sample material at the emplacement is a shock-tube or pressure generator.

35. An apparatus as in claim 5, wherein the dedicated component or system of components in the thermal perturbation system that primarily induces the thermal perturbation to the sample material at the emplacement is a microwave generator.

36. An apparatus as in claim 5, wherein the dedicated component or system of components in the thermal perturbation system that primarily induces the thermal perturbation to the sample material at the emplacement is a visible wavelength laser generator.

37. An apparatus as in claim 5, wherein the dedicated component or system of components in the thermal perturbation system that primarily induces the thermal perturbation to the sample material at the emplacement is an infrared wavelength laser generator.

38. An apparatus as in claim 5, wherein the dedicated component or system of components in the thermal perturbation system that primarily induces the thermal perturbation to the sample material at the emplacement is an electrical resistance heating device consisting of a current or voltage generator, electrical cable leads, electrodes, and the use of the sample emplacement material region as an effective electrical resistance element.

39. An apparatus as in claim 5, wherein the dedicated component or system of components in the thermal perturbation system that primarily induces the thermal perturbation to the sample material at the emplacement is an electromagnetic induction device consisting of a current generator, a conductive induction winding that enshrouds the emplacement location, and the use of the sample and the material surrounding the emplacement as the inductor core plug material.

40. An apparatus as in claim 5, wherein the dedicated component or system of components in the thermal perturbation system that primarily induces the thermal perturbation to the sample material at the emplacement is a spatial heating device or fluid in direct contact with the sample material at the emplacement location.

* * * * *